(12) United States Patent
Wei et al.

(10) Patent No.: US 10,249,087 B2
(45) Date of Patent: Apr. 2, 2019

(54) ORTHOGONAL-PROJECTION-BASED TEXTURE ATLAS PACKING OF THREE-DIMENSIONAL MESHES

(71) Applicant: Magic Leap, Inc., Plantation, FL (US)

(72) Inventors: Xiaolin Wei, Fremont, CA (US); Yifu Zhang, San Jose, CA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

(21) Appl. No.: 15/413,284

(22) Filed: Jan. 23, 2017

(65) Prior Publication Data
US 2017/0221263 A1 Aug. 3, 2017

Related U.S. Application Data

(60) Provisional application No. 62/289,059, filed on Jan. 29, 2016.

(51) Int. Cl.
*G06T 17/20* (2006.01)
*G06T 15/04* (2011.01)
*G06T 11/00* (2006.01)

(52) U.S. Cl.
CPC .......... *G06T 17/205* (2013.01); *G06T 11/001* (2013.01); *G06T 15/04* (2013.01); *G06T 2210/12* (2013.01)

(58) Field of Classification Search
CPC ......... G06T 17/205; G06T 15/04; G06T 1/20; G06T 11/001; G06T 2210/12
(Continued)

(56) References Cited

U.S. PATENT DOCUMENTS

2003/0206178 A1 11/2003 Hoppe et al.
2007/0296719 A1 12/2007 Sander et al.
(Continued)

FOREIGN PATENT DOCUMENTS

WO WO 2014/210394 A1 12/2014
WO WO 2017/132217 A1 8/2017

OTHER PUBLICATIONS

Notification of Transmittal of the International Search Report and Written Opinion of the International Searching Authority, or the Declaration for International Patent Application No. PCT/US2017/014866 dated Apr. 5, 2017, 8 pages.
(Continued)

*Primary Examiner* — Kimberly A Williams
(74) *Attorney, Agent, or Firm* — Kilpatrick Townsend & Stockton LLP

(57) ABSTRACT

A method of atlas packing includes receiving a three-dimensional (3D) mesh that includes a plurality of triangles representing surfaces of one or more objects; for each respective triangle, determining a normal of the respective triangle, and categorizing the respective triangle into one of six directions along positive and negative of x-, y-, and z-directions; categorizing triangles in each respective direction into one or more layers orthogonal to the respective direction; for each respective layer, identifying one or more connected components; projecting each respective connected component onto a plane orthogonal to the respective direction to obtain a corresponding projected two-dimensional (2D) connected component; cutting the projected 2D connected component into one or more sub-components; packing the bounding boxes of all sub-components into one or more atlases; and for each respective triangle of each sub-component, copying a texture of a corresponding triangle of the 3D mesh to the respective triangle.

20 Claims, 18 Drawing Sheets

(58) Field of Classification Search
USPC .................................................... 345/423
See application file for complete search history.

(56) References Cited

U.S. PATENT DOCUMENTS

| | | | | |
|---|---|---|---|---|
| 2014/0333621 | A1* | 11/2014 | Hillesland | G06T 15/04 |
| | | | | 345/423 |
| 2017/0090460 | A1* | 3/2017 | Andrew | B33Y 50/02 |
| 2017/0091993 | A1* | 3/2017 | Andrew | G06F 3/04812 |
| 2017/0278293 | A1* | 9/2017 | Hsu | G06T 11/001 |
| 2017/0337726 | A1* | 11/2017 | Bui | G06T 15/04 |
| 2018/0075641 | A1* | 3/2018 | Ceylan | G06T 15/04 |

OTHER PUBLICATIONS

Apaza-Agüero, et al., "Projection Mapping on Arbitrary Cubic Cell Complexes", Computer Graphics Forum, vol. 33, No. 1, Dec. 24, 2013, pp. 152-163.
Burger, et al., "Sample-Based Surface Coloring", IEEE Transactions on Visualization and Computer Graphics, vol. 16, No. 5, Sep. 1, 2010, pp. 763-776.
Carr, et al., "Meshed Atlases for Real-Time Procedural Solid Texturing", ACM Transactions on Graphics (TOG), vol. 21, No. 2, Apr. 1, 2002, pp. 106-131.
EP17744812.3, "Extended European Search Report", dated Dec. 5, 2018, 12 pages.
Jong, et al., "High Quality Surface Remeshing with Equilateral Triangle Grid", The Visual Computer: International Journal of Computer Graphics, vol. 26, No. 2, Aug. 27, 2009, pp. 121-136.
Lensch, et al., "Interactive Rendering of Translucent Objects", Computer Graphics and Applications, Proceedings, 10th Pacific Conference on Beijing, China, Oct. 9, 2002, pp. 214-224.
Purnomo, et al., "Seamless Texture Atlases", Proceedings of the Fourth Eurographics Symposium on Geometry Processing ACM; International Conference Proceeding Series, Jul. 8, 2004, pp. 65-74.
Tarini, et al., "PolyCube-Map", ACM Transactions on Graphics (TOG). ACM, Aug. 1, 2004, pp. 853-860.

* cited by examiner

ORTHOGONAL-PROJECTION-BASED TEXTURE ATLAS PACKING OF THREE-DIMENSIONAL MESHES

CROSS-REFERENCES TO RELATED APPLICATIONS

This application claims the benefit of U.S. Provisional Patent Application No. 62/289,059, filed on Jan. 29, 2016, the contents of which is incorporated by reference in its entirety.

BACKGROUND OF THE INVENTION

In computer graphics, a texture atlas (also called a tile map, tile engine, or sprite sheet) is a large image containing a collection, or "atlas," of sub-images, each of which is a texture map for some part of a three-dimensional (3D) model. It may be desirable to efficiently pack triangle textures in a 3D mesh into rectangular texture atlases. An efficient packing method can greatly reduce the size of atlas images, and thus improve the performance of mesh texture rendering as well as mesh storage.

SUMMARY OF THE INVENTION

According to an embodiment of the present invention, a method of atlas packing includes receiving a three-dimensional (3D) mesh. The 3D mesh includes a plurality of triangles representing surfaces of one or more objects. Each triangle has a respective texture. The method further includes, for each respective triangle of the plurality of triangles, determining a normal of the respective triangle, and categorizing the respective triangle into one of six directions along positive and negative of x-, y-, and z-directions according a predominant component of the normal. The method further includes categorizing triangles in each respective direction of the six directions into one or more layers orthogonal to the respective direction. The method further includes, for each respective layer in a respective direction, identifying one or more connected components, each connected component comprises a plurality of connected triangles; projecting each respective connected component onto a plane orthogonal to the respective direction to obtain a corresponding projected two-dimensional (2D) connected component; and cutting the projected 2D connected component into one or more sub-components. Each sub-component is contained within a respective rectangular bounding box. The method further includes packing the bounding boxes of all sub-components of all projected 2D connected components in all layers in all directions into one or more atlases; and for each respective triangle of each sub-component in each atlas, copying a texture of a corresponding triangle of the 3D mesh to the respective triangle.

DETAILED DESCRIPTION OF SPECIFIC EMBODIMENTS

The present invention relates generally to methods of texture atlas packing. More specifically, the present invention relates to methods of orthogonal-projection-based texture atlas packing of three-dimensional (3D) meshes. According some embodiments, a 3D meshe may include a polygon mesh. A polygon mesh is a collection of vertices, edges and faces that defines the shape of a polyhedral object in 3D computer graphics and solid modeling. The faces usually include triangles (triangle mesh), quadrilaterals, or other convex polygons. The faces may also include concave polygons, polygons with holes, and spiral shapes.

Merely by way of example, the invention may be applied to generate efficient atlas packing of 3D meshes of objects with shape-orthogonality characteristics. For example, manmade structures, such as houses, buildings, and stadiums, usually have regular rectangle shapes. For such structures, the major components of the meshes are usually orthogonally aligned. For example, large flat surfaces such as walls, ceilings, or floors are usually either parallel or perpendicular to each other.

Figure 1:
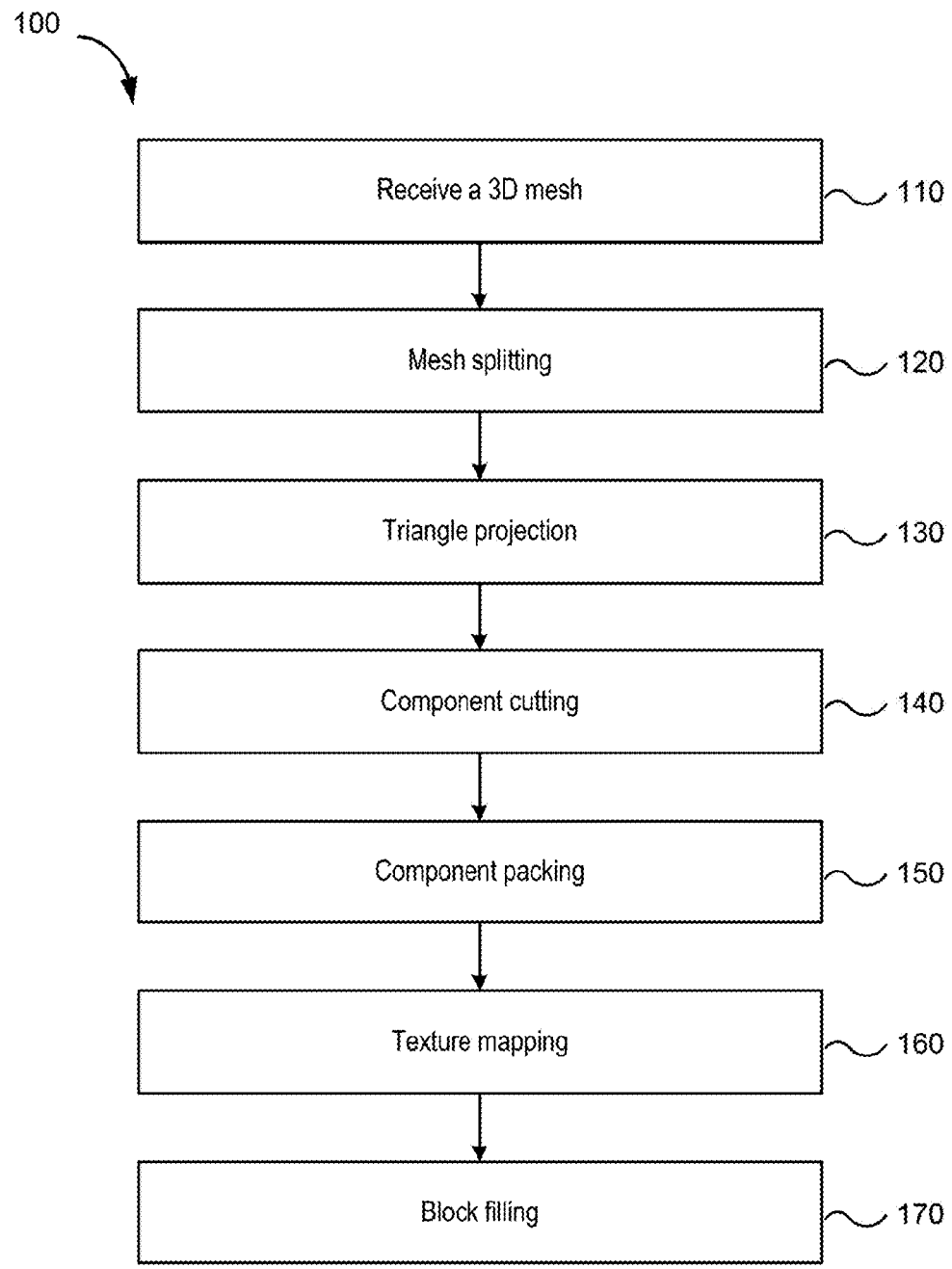
FIG. 1 shows a simplified flowchart illustrating a method of packing a triangle 3D mesh into texture atlases according to an embodiment of the present invention.
Figure 18:
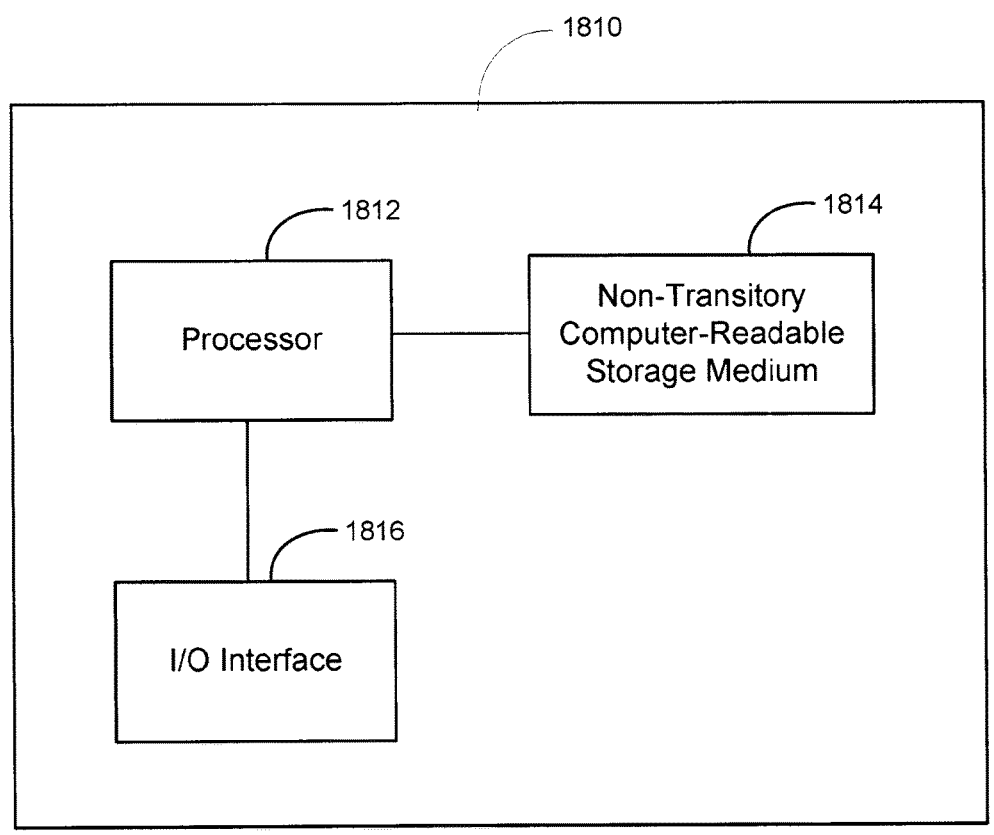
FIG. 18 shows a computer system according to an embodiment of the present invention.

FIG. 1 shows a simplified flowchart illustrating a method 100 of packing a triangle 3D mesh into texture atlases according to an embodiment of the present invention. The method 100 may include the following main steps: receive a 3D mesh (110); mesh splitting (120); triangle projection (130); component cutting (140); component packing (150); texture mapping (160); and block filling (170). Some of these steps may be optional. As discussed above, the received 3D mesh can include components based on triangles (triangle mesh), quadrilaterals, or other convex polygons. As will be evident to one of skill in the art, the received 3D mesh represents a three-dimensional object or structure. Additionally, although triangle meshes are discussed herein, embodiments of the present invention are not limited to triangle meshes. The method 100 may be implemented by a computer system 1810 comprising a processor 1812 and a non-transitory computer-readable storage medium 1814 storing instructions as illustrated in FIG. 18. The details of each of the steps 120, 130, 140, 150, 160, and 170 are described in further detail below.

A. Mesh Splitting

Figure 2:
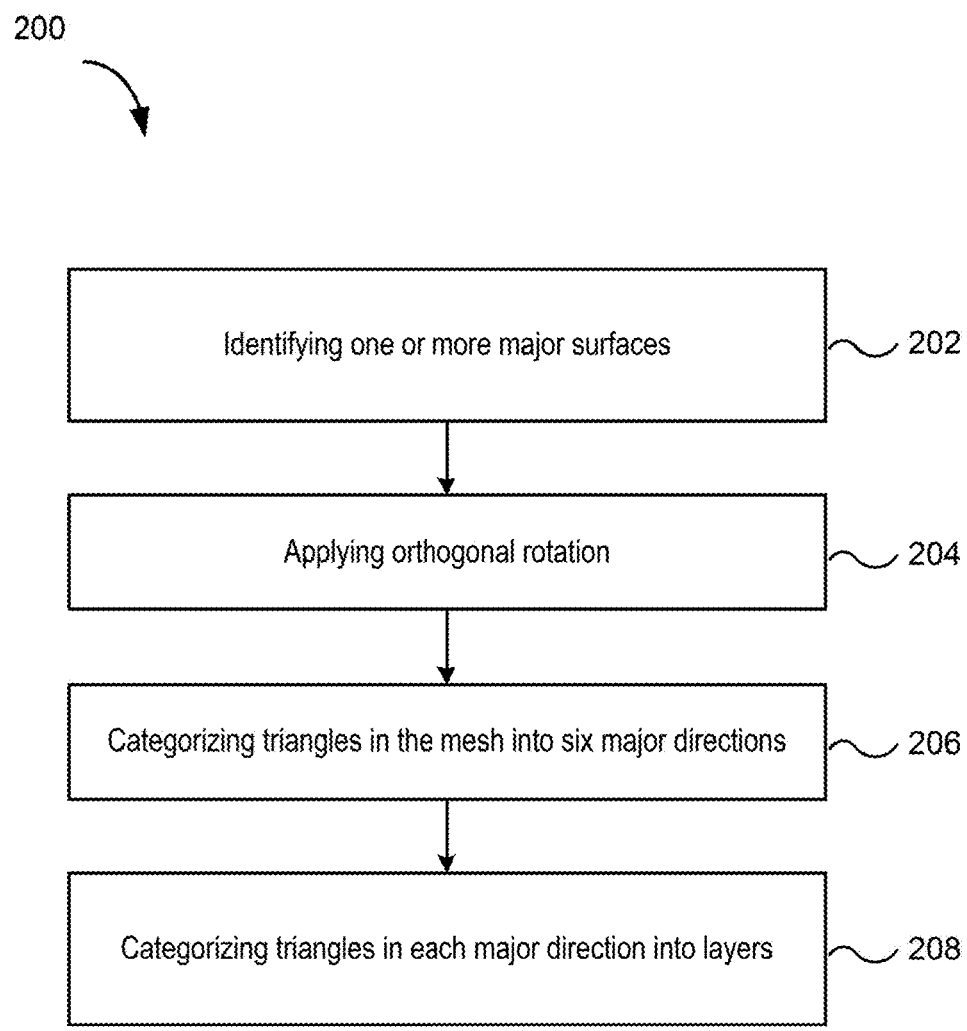
FIG. 2 shows a simplified flowchart illustrating a method of performing mesh splitting to a three-dimensional (3D) mesh according to an embodiment of the present invention.

FIG. 2 shows a simplified flowchart illustrating a method 200 of performing mesh splitting according to an embodiment of the present invention. The method 200 may include, at 202, identifying one or more major surfaces, such as walls, ceilings, and floors, in the 3D mesh. The method 200 may further include, at 204, applying an orthogonal rotation to the 3D mesh so that each of the major surfaces is aligned with one of the three orthogonal major axes, namely the x-, y-, and z-axes. This may be achieved by calculating a normal for each major surface, and aligning the normal of each major surface to one of the three major axes. Orthogonal rotation may not be necessary if the major surfaces are already aligned with the major axes.

The method 200 further includes, at 206, categorizing each triangle in the 3D mesh into one of six major directions, namely the positive and negative x-, y-, and z-directions. A triangle may be categorized to the direction along which its normal has a predominant component. For example, if the normal of a triangle points predominantly in the positive z-axis (i.e., the largest component of the normal is in the positive z-axis), that triangle may be categorized to the positive z-direction.

The method 200 may further include, at 208, categorizing triangles in each of the six major directions into a plurality of layers. In one embodiment, the space in each direction may be evenly divided by parallel planes orthogonal to that direction. For example, the space in the positive z-direction may be evenly divided by parallel planes orthogonal to the z-direction. Triangles in the positive z-direction lying between two adjacent planes may be categorized into one layer. The position of a triangle may be determined by the geometrical center of the triangle. In some other embodiments, the space in each direction does not have to be divided evenly. For example, the space in the positive z-direction may be divided by planes orthogonal to the z-direction with varying distances between adjacent planes.

After triangles in all six major directions are categorized into one or more layers as described above, connected components may be identified in each layer. A connected component comprises one or more triangles connected by common edges or corners. If a scene approximately meets the orthogonality criterion as described above, most connected components may be split into rectangle-like objects, facilitating efficient packing performance as will be described further below.

B. Triangle Projection

According to an embodiment, for each layer in each major direction, each connected component may be projected to a plane orthogonal to the respective direction. Thus, a projected two-dimensional (2D) image can be created for each connected component. The vertices of the triangles in the projected 2D image may be stored or recorded in actual measurement units, e.g., in meters. In some embodiments, the projection can be scaled. For example, a 2D atlas image may be measured in pixels, e.g., 2048×2048 per image. When a 2-meter-by-2-meter connected component, representing for example a wall, is projected to a 2048×2048 image, a corresponding scale factor would be 1024.

In some cases, projecting a connected component into a 2D image may result in overlapping triangles. This may occur even for a connected component with triangles roughly facing the same direction, such as a connected component representing a spiral shaped surface. A step of component splitting may be needed when an overlapping triangle is found.

C. Component Cutting

Since a final atlas is usually a rectangle image, it may be more efficient to pack rectangular shapes into the atlas. According to an embodiment of the present invention, a projected 2D connected component can be cut into multiple sub-components, so that each sub-component efficiently fits into a rectangular image. In some cases, if an orthogonal rotation has been applied to the 3D mesh and if the scene consists mainly of orthogonal surfaces such as walls, ceilings, and floors, some or most of the projected 2D connected components may likely have rectangular contours (i.e., with straight edges in vertical or horizontal directions).

Figure 3:
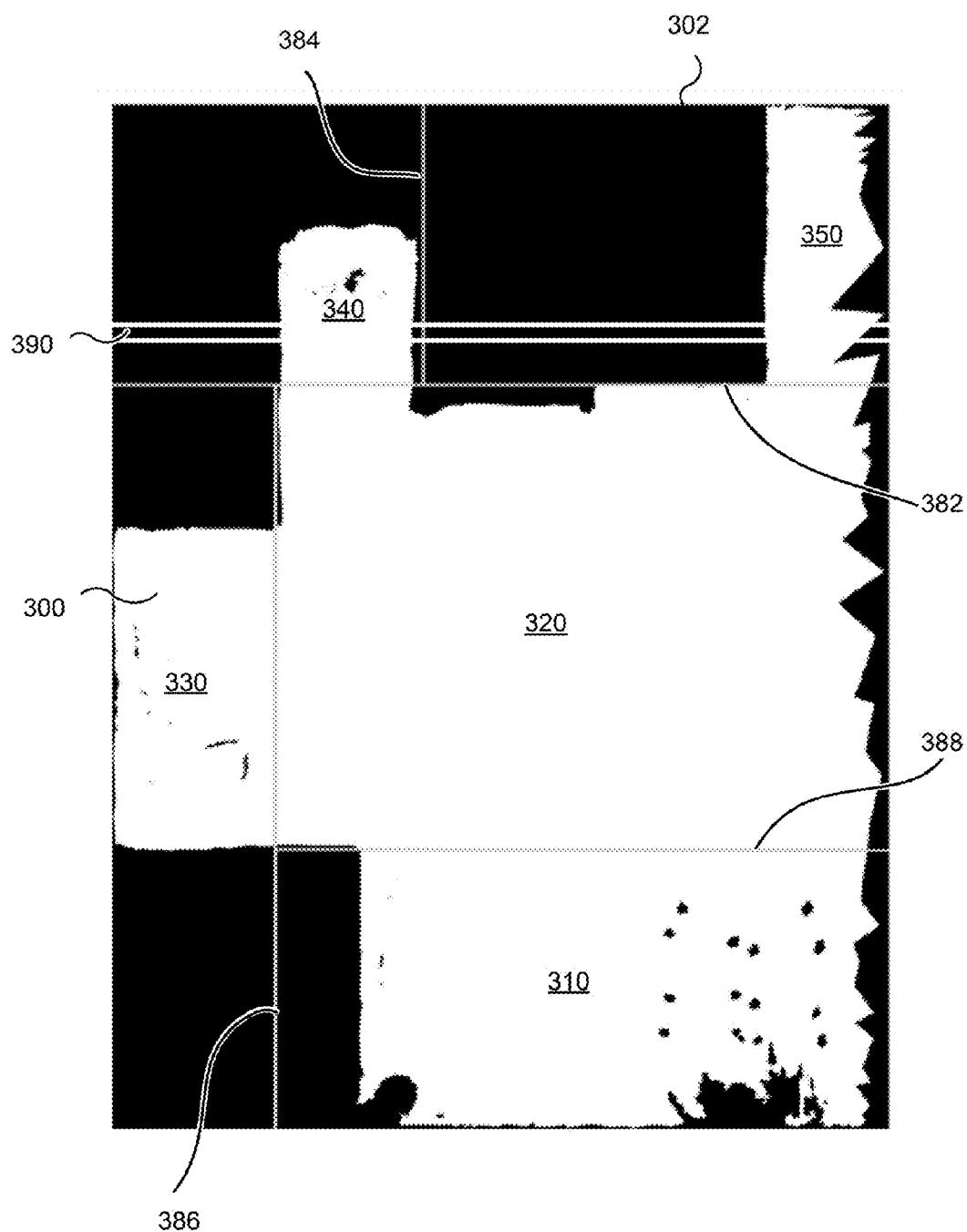
FIG. 3 shows an exemplary projected 2D connected component according to an embodiment of the present invention.

FIG. 3 shows an exemplary projected 2D connected component 300 according to an embodiment of the present invention. The white area represents the projected 2D connected component 300. The outer rectangular area 302 is a bounding box for the projected 2D connected component 300. A bounding box is a smallest rectangular box that contains the projected 2D connected component. As can be seen in FIG. 3, there are some dark areas within the bounding box 302. Thus, a ratio between the area of the projected 2D connected component 300 and the area of the bounding box 302 may be less than optimal.

According to embodiments of the present invention, the optimization can be a function of the area of the projected 2D connected component and/or the area of the bounding box. As an example, if the area of the projected 2D connected component is large (e.g., greater than a predetermined threshold value), the optimal ratio between the area of the projected 2D connected component and the area of the bounding box may be about 80% to about 90% or higher. It should be appreciated that achieving higher ratios may come at a cost of computing time and computing resources, and the like. Accordingly, if the area of the projected 2D connected component is small (e.g., less than a predetermined threshold value), the optimal ratio between the area of the projected 2D connected component and the area of the bounding box may be less than 80%, for example about 50% or another appropriate value that is consistent with the area of the projected 2D connected component. Therefore, embodiments of the present invention may utilize different threshold values for the optimal ratio that scale with the area of the projected 2D connected component, for example, increasing the optimal ratio with increasing area.

Figure 4:
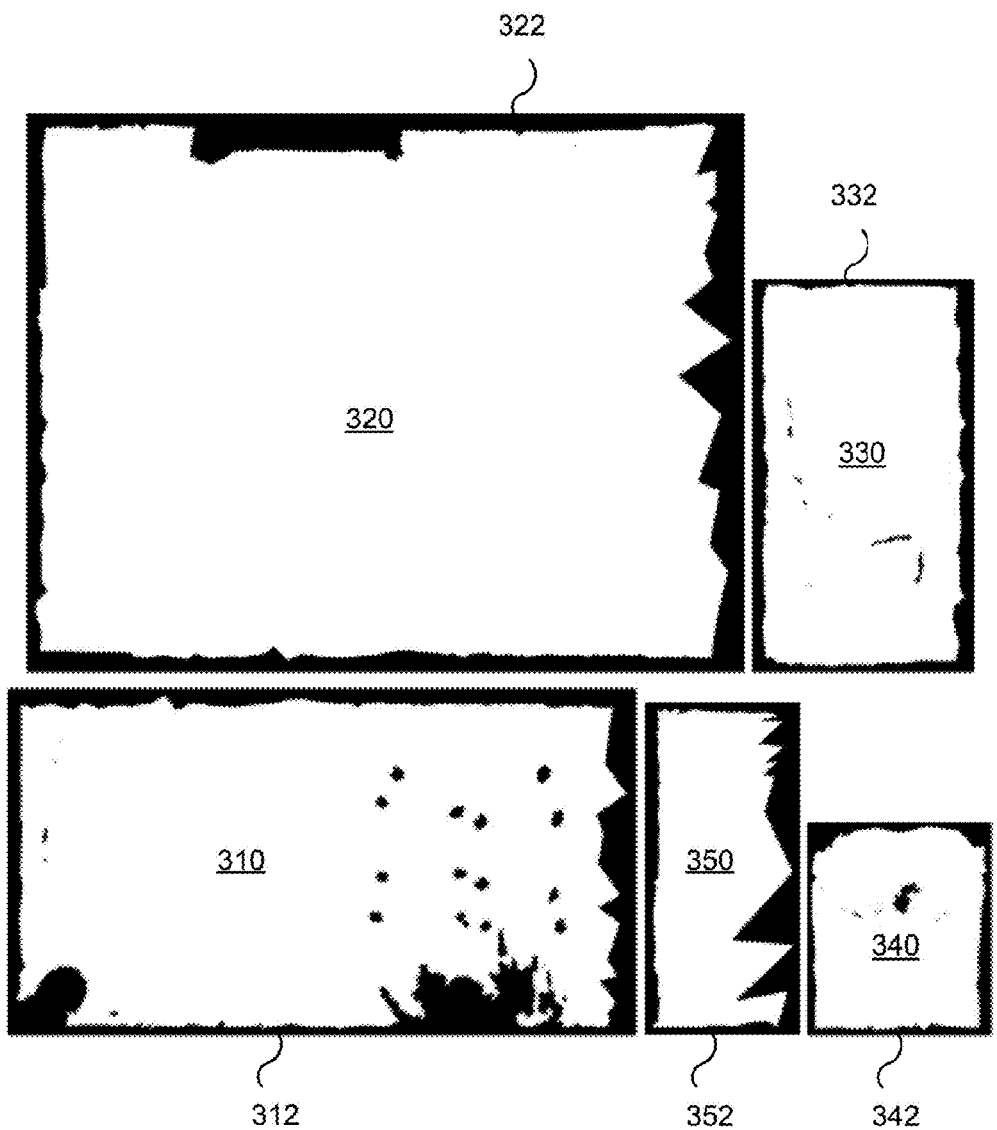
FIG. 4 shows some exemplary sub-components created by cutting the projected 2D connected component illustrated in FIG. 3 according to an embodiment of the present invention.

According to an embodiment, the projected 2D connected component 300 shown in FIG. 3 may be cut along the straight lines 382, 384, 386, and 388, to result in five sub-components 310, 320, 330, 340, and 350. Each of the five sub-components 310, 320, 330, 340, and 350 may be contained within a respective rectangular bounding box 312, 322, 332, 342, or 352, as illustrated in FIG. 4. As can be seen in FIG. 4, the sum of the areas of the bounding boxes 312, 322, 332, 342, or 352 for the five sub-components 310, 320, 330, 340, and 350 may be less than the area of the bounding box 302 for the original projected 2D connected component 300. Therefore, the sub-components 310, 320, 330, 340, and 350 can be packed more efficiently than the original projected 2D connected component 300. Note that there is some pixel padding at the edges of each bounding box 312, 322, 332, 342, or 352 (i.e., the dark area around the edges), so as to prevent texture mixing at the edges of the components when the bounding boxes are packed into an atlas.

Figure 5:
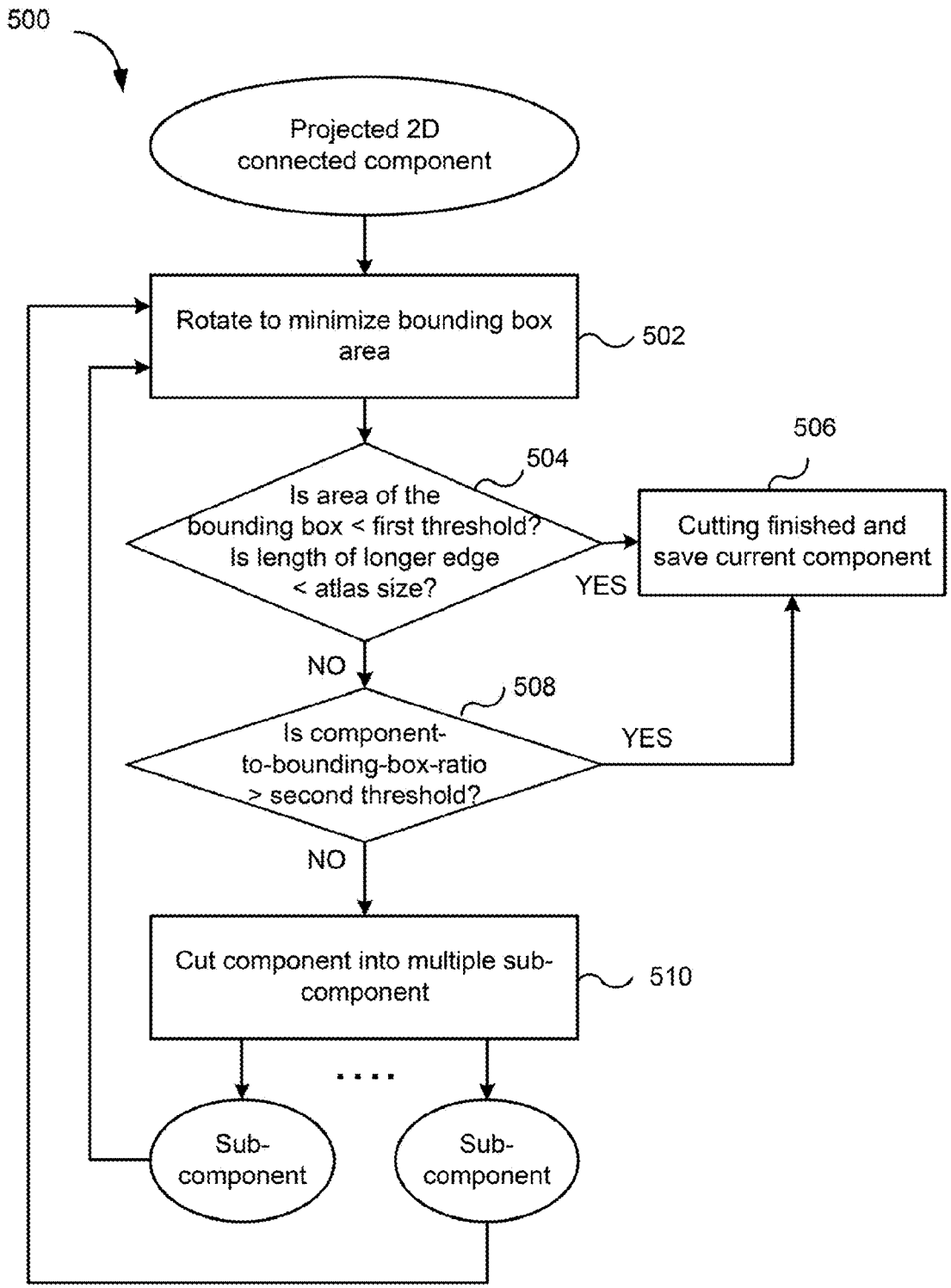
FIG. 5 shows a simplified flowchart illustrating a method of cutting a projected 2D connected component according to an embodiment of the present invention.

FIG. 5 shows a simplified flowchart illustrating a method 500 of cutting a projected 2D connected component according to an embodiment of the present invention. The method 500 may include, at 502, rotating the projected 2D connected component so that the area of a bounding box is minimized. For instance, in the example illustrated in FIG. 3, the projected 2D connected component 300 may be rotated so that the major straight edges of the projected 2D connected component 300 are substantially parallel to the edges of the bounding box 302, as shown in FIG. 3. If the projected 2D connected component is already oriented optimally, the rotation may not be necessary.

The method 500 further includes, at 504, determining whether the area of the bounding box is less than or equal to a first predetermined threshold and whether the longer edge of the bounding box is less than or equal to an atlas size (e.g., a length of a rectangular or square shaped atlas). If it is determined that the area of the bounding box is less than or equal to the first predetermined threshold and the longer edge is less than or equal to the atlas size, then no further cutting is performed and the current projected 2D connected component is saved (506).

If it is determined that the area of the bounding box is greater than the first predetermined threshold or the longer edge is greater than the atlas size, the method 500 proceeds to, at 508, determining whether the ratio of the area of the projected 2D connected component and the area of the bounding box is less than or equal to a second predetermined threshold. If it is determined that the ratio is greater than or equal to the second predetermined threshold, no further cutting is performed and the current projected 2D connected component is saved (506). If it is determined that the ratio is less than the second predetermined threshold, the method 500 proceeds to, at 510, cutting the projected 2D connected component into multiple sub-components. Each sub-component may undergo further cuts using the method 500.

As discussed above in relation to FIG. 3, the optimal ratio, referred to with respect to FIG. 5 as the second predetermined threshold, can be a function of the area of the projected 2D connected component and/or the area of the bounding box. If the area of the projected 2D connected component and/or the area of the bounding box is large, the second predetermined threshold may be about 80% to about 90% or higher. If the area of the projected 2D connected component and/or the area of the bounding box is small, the second predetermined threshold may be less than 80%, for example about 50% or another appropriate value that is consistent with the area of the projected 2D connected component and/or the area of the bounding box.

In some embodiments, a projected 2D connected component may be cut along an optimal straight vertical or horizontal line to result in two or more sub-components, so that the sum of the areas of the bounding boxes for the two or more sub-components is minimized. In one embodiment, the optimal straight cut line may be along an edge of the projected 2D connected component, which can be found by searching in the vertical or horizontal direction for maximum unit area variation.

For instance, in the example illustrated in FIG. 3, for each small segment of the vertical axis, its unit area is an intersection area of the projected 2D connected component and a rectangular strip 390 defined by the small segment. By scanning through each small segment along the vertical axis, if there is a large jump between the unit areas of two adjacent small segments, it is likely that the component has an edge between the two small segments. For instance, in the example illustrated in FIG. 3, there may be a large jump between the unit areas of the vertical small segments just below and just above the horizontal straight line 382. Therefore, a cut along the horizontal straight line 382 may result in three sub-components, namely the sub-component below the line 382 and the two sub-components 340 and 350 above the line 382.

The sub-component below the line 382 may be further cut into two or more sub-components using the same algorithm. For example, by scanning through each small segment along the horizontal axis, an edge may be detected at the vertical straight line 386. A cut along the line 386 may result in two sub-components, namely the sub-component 330 and the sub-component to the right of the line 386. The sub-component to the right of the line 386 may be further cut along the horizontal straight line 388 to result in the two sub-components 310 and 320.

D. Component Packing

After all components or sub-components have been finalized, the bounding boxes of the components can be packed into atlases. Since the atlases have a rectangular shape, rectangular bounding boxes may be packed efficiently into a minimum number of atlases. In some embodiments, the atlases may have a square or rectangle shape with a fixed size.

Figure 6:
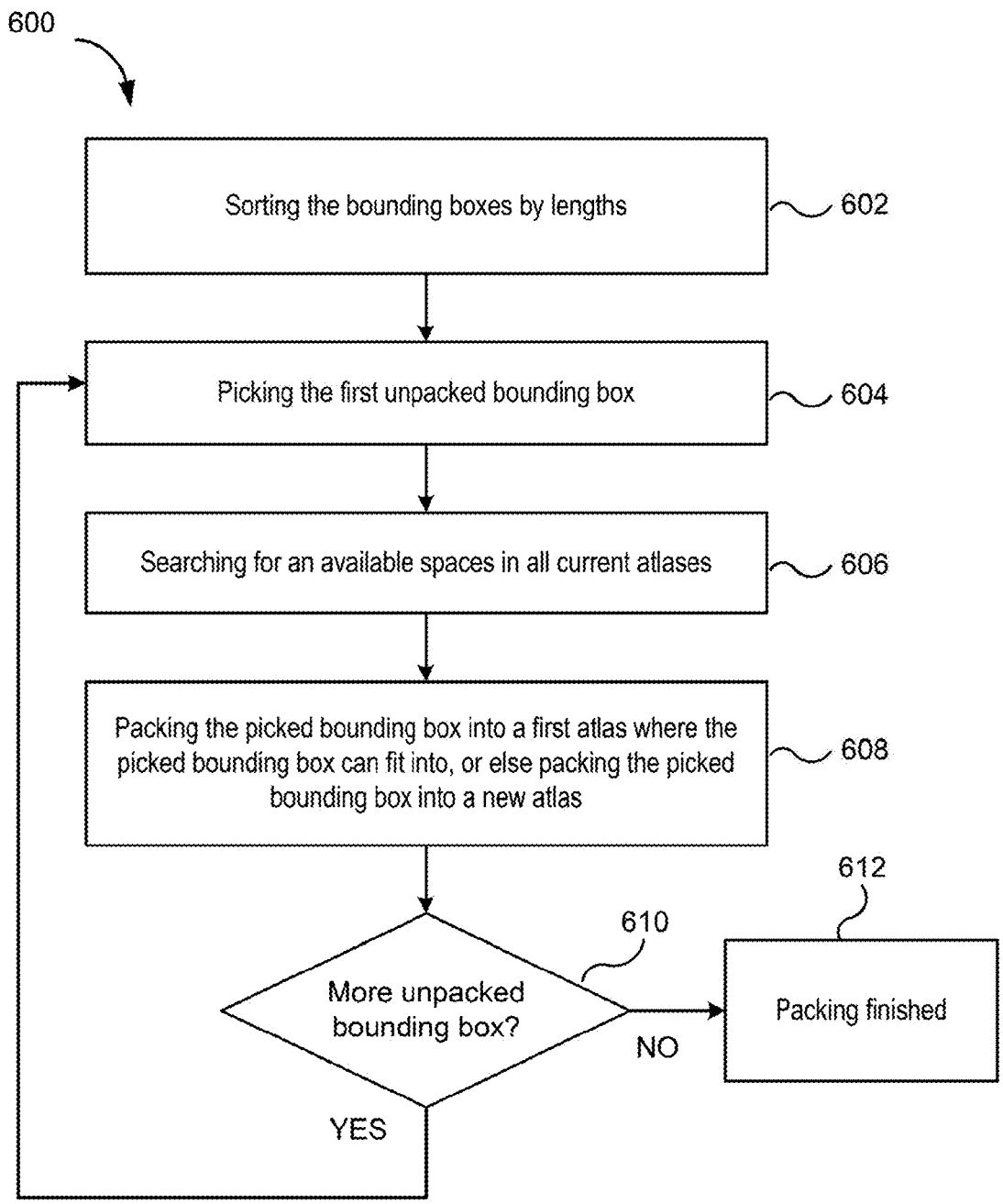
FIG. 6 shows a simplified flowchart illustrating a method of packing components into atlases according to an embodiment of the present invention.

FIG. 6 shows a simplified flowchart illustrating a method 600 of packing components into one or more atlases according to an embodiment of the present invention. The method 600 includes, at 602, sorting the bounding boxes in descending order by the lengths of their longer edges. Bounding boxes may be rotated by 90 degrees, if necessary, so that their longer edges are horizontal.

The method 600 further includes, at 604, picking the first unpacked bounding box; at 606, searching for an available space in all current atlases, for example in an allocation order; and at 608, packing the picked bounding box into a first atlas where the picked bounding box can fit into. In one embodiment, the bounding boxes can be packed column by column in an atlas. If no available space is found in all current atlases, the picked bounding box is packed into a new atlas. The method 600 further includes, at 610, determining if there is any unpacked bounding boxes left. If it is determined that there is no more unpacked bounding boxes, packing is finished (612). If there is more unpacked bounding boxes, the method 600 continues with a next unpacked bounding box.

Figure 7:
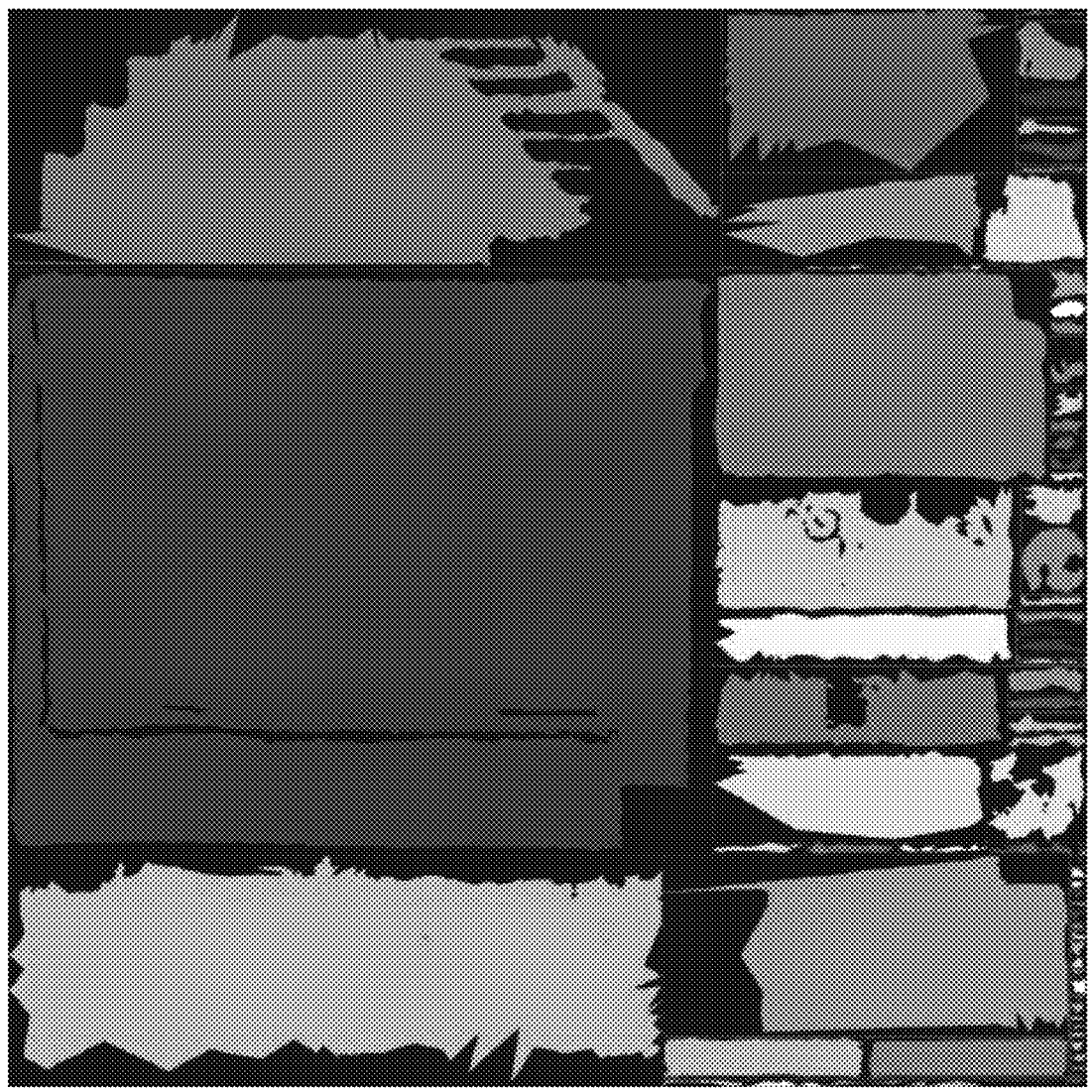
FIGS. 7 and 8 show some exemplary atlases into which rectangular-like shaped components are efficiently packed according to an embodiment of the present invention.
Figure 8:

FIGS. 7 and 8 show two exemplary atlases into which rectangular-like shaped components are efficiently packed according to an embodiment of the present invention. Different components are represented by different colors. (Note that the colors are not textures for the components.) The purple lines defining the rectangles are boundaries of the bounding boxes. The scenes represented by the atlases shown in FIGS. 7 and 8 are parts of an indoor scene. Since these scenes meet the orthogonality criterion discussed above, the large components are substantially rectangular.

Thus, efficient packing may be realized according to embodiments of the present invention.

E. Texture Mapping

After the bounding boxes for all the components have been packed into atlases, the texture of each triangle in the input 3D mesh (i.e., the source triangle) may be copied to a corresponding triangle in the atlases (i.e., the target triangle).

Figure 9:
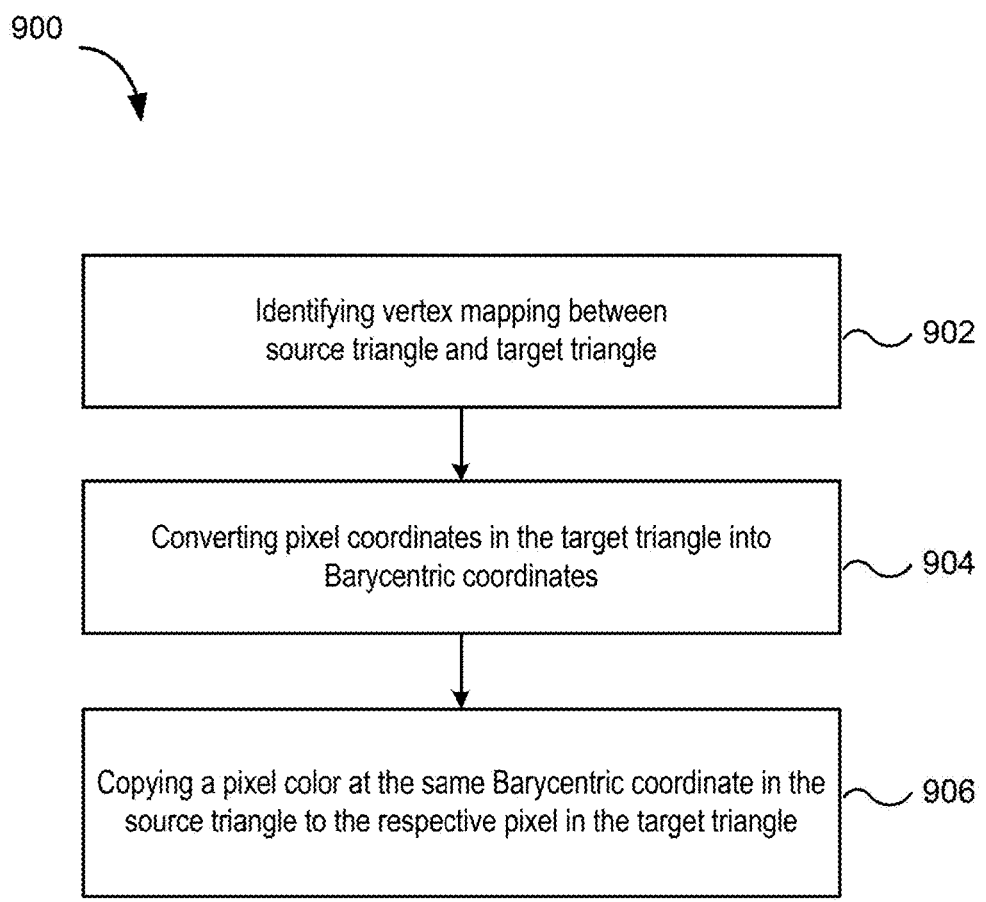
FIG. 9 shows a simplified flowchart illustrating a method of texture mapping according to an embodiment of the present invention.

FIG. 9 shows a simplified flowchart illustrating a method 900 of texture mapping according to an embodiment of the present invention. The method 900 includes, at 902, identifying vertex mapping between each source triangle and a corresponding target triangle; at 904, for each respective pixel in the target triangle, converting the pixel coordinate into a Barycentric coordinate; and at 906, copying all pixel colors at the same Barycentric coordinate in each source triangle to the respective pixels in the target triangle. In some embodiments, bilinear interpolation may be used at step 906.

Figure 10:
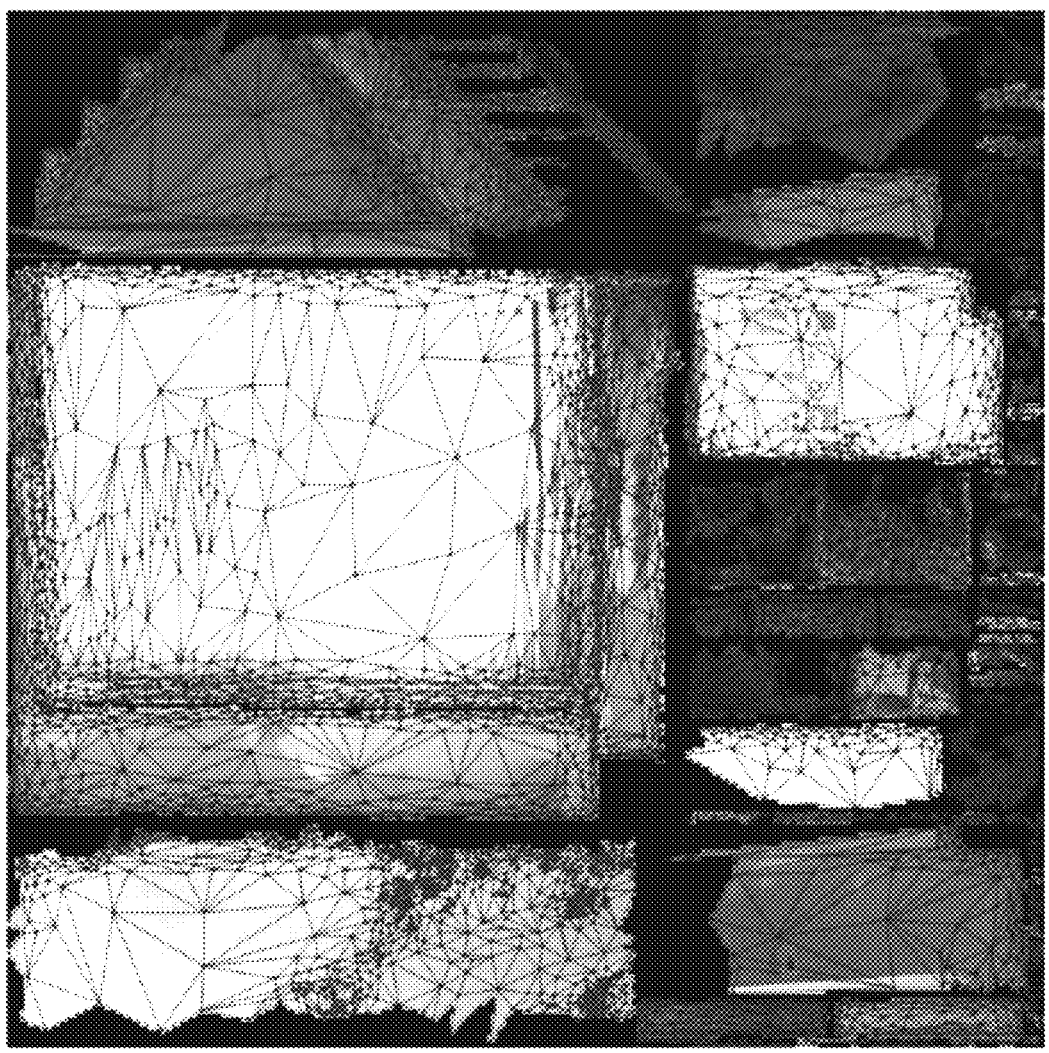
FIGS. 10 and 11 show the atlases illustrated in FIGS. 7 and 8, respectively, after the components have been textured.
Figure 11:
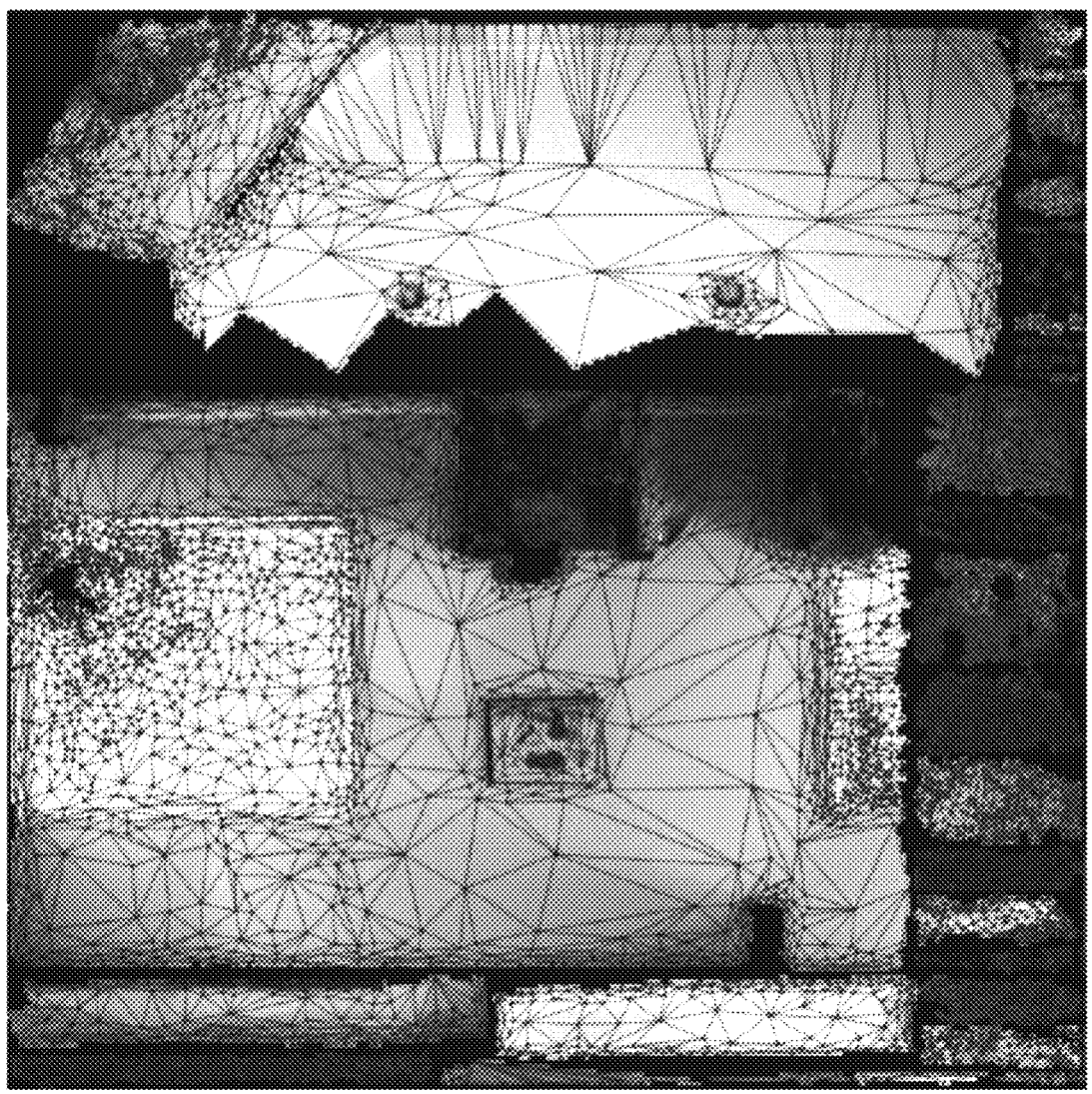

FIGS. 10 and 11 show the atlases illustrated in FIGS. 7 and 8 after the components have been textured. The line segments of the triangles are triangle edges.

F. Block Filling

The textured atlases obtained by the method 900 may be stored for later rendering. The atlas images may be saved in a compressed format, such as the JPEG, the H.264/AVC format, or the H.265/HEVC format. According to some embodiments of the present invention, block-filling may be performed to the textured atlases to improve image compression efficiency and thus reduce storage size.

Figure 12A:
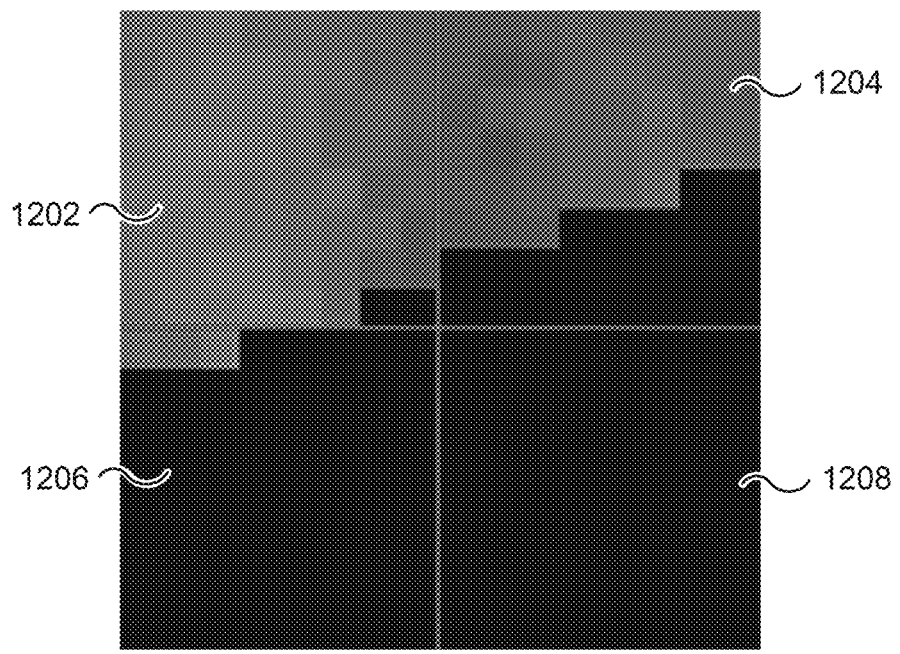
FIG. 12A illustrates a portion of an atlas where some pixels are colored and some pixels are dark.

Before block filling, a pixel that is part of a component may be colored with texture, while a pixel that is part of a component may be dark, i.e., in RGB value (0,0,0). FIG. 12A illustrates a portion of an atlas where some pixels are colored and some pixels are dark. For the JPEG compression standard, an atlas image may be divided into 8-pixel-by-8-pixel blocks. For example, the portion of the atlas illustrated in FIG. 12A is divided into four 8×8 blocks 1202, 1204, 1206, and 1208. Each 8×8 block may be separately transformed and quantized. For an 8×8 block that includes both textured pixels and dark pixels, such as the blocks 1202, 1204, and 1206 shown in FIG. 12A, the transformed domain may contain large high-frequency components, which may affect compression efficiency and image quality. On the other hand, if an 8×8 block includes only dark pixels, such as the block 1208 shown in FIG. 12A, both the transform and quantization may result in zero output, and thus may already be efficient.

Figure 13:
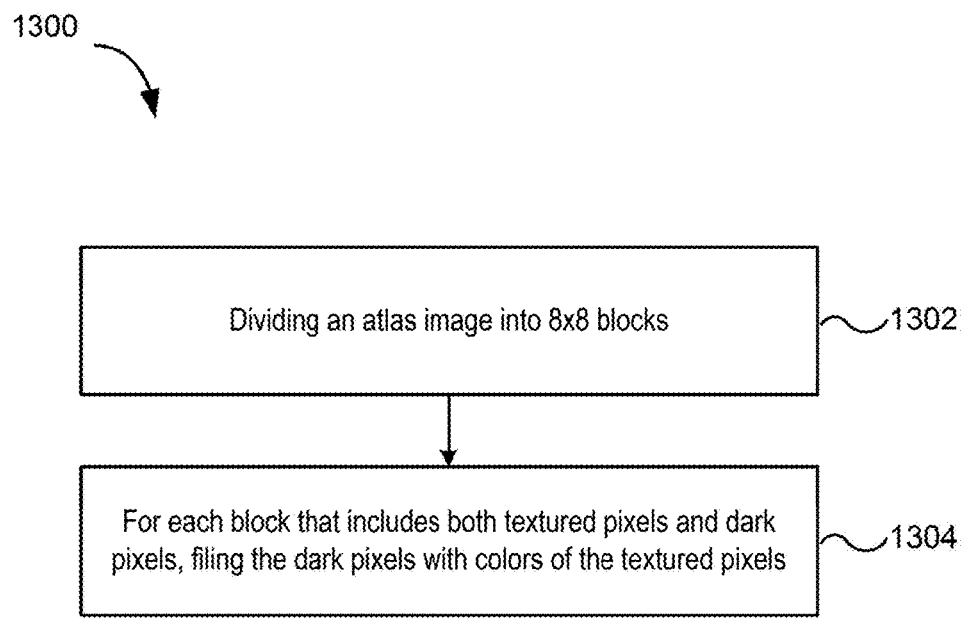
FIG. 13 shows a simplified flowchart illustrating a method of block filling a textured atlas according to an embodiment of the present invention.

FIG. 13 shows a simplified flowchart illustrating a method 1300 of block filling according to an embodiment of the present invention. The method 1300 includes, at 1302, dividing an atlas image into 8×8 blocks; and, at 1304, for each block that includes both textured pixels and dark pixels, filling the dark pixels with colors of the textured pixels. In one embodiment, a flood fill algorithm may be used for filling the dark pixels.

Figure 12B:
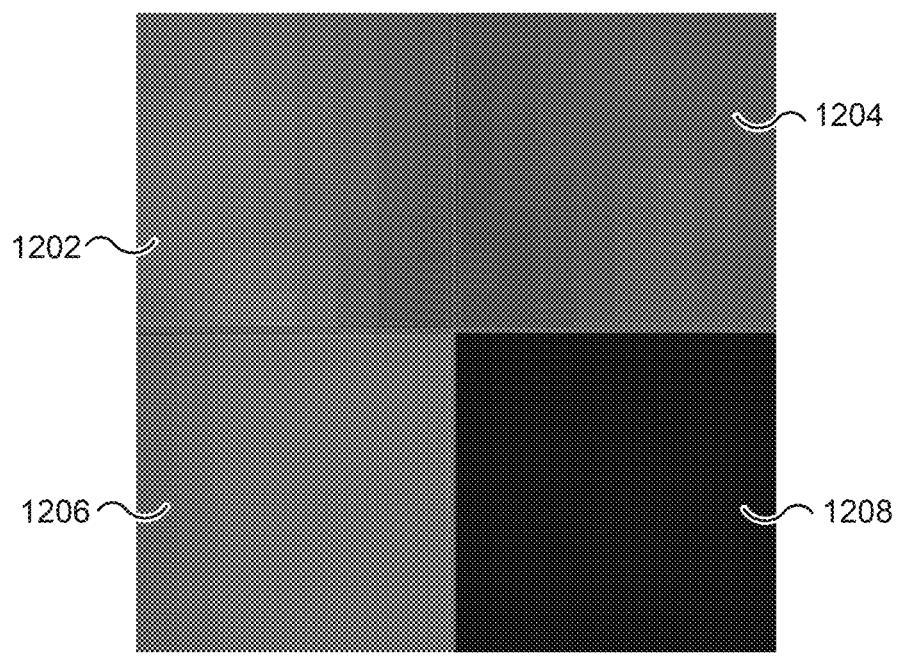
FIG. 12B shows the portion of the atlas illustrated in FIG. 12A after block-filling according to an embodiment of the present invention.

FIG. 12B shows the portion of the atlas shown in FIG. 12A after block-filling according to an embodiment of the present invention. Note the blocks 1202, 1204, and 1206, each of which previously includes both textured pixels and dark pixels as shown in FIG. 12A, now include only textured pixels. Therefore, the transformed domain for those blocks contains no high-frequency noisy components from dark pixels, and thus may be compressed more efficiently. The block 1208, which includes only dark pixels, is unchanged.

Figure 14A:
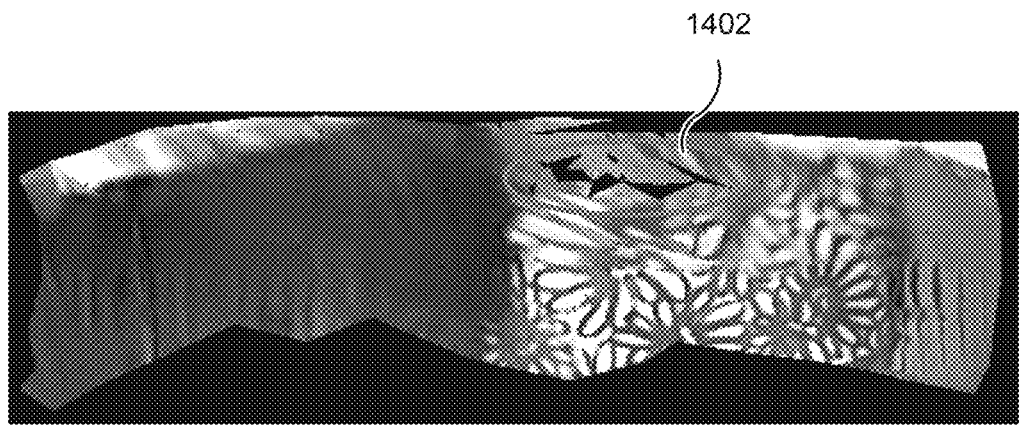
FIGS. 14A and 14B show a portion of an atlas image before and after block-filling, respectively, according to an embodiment of the present invention.
Figure 14B:
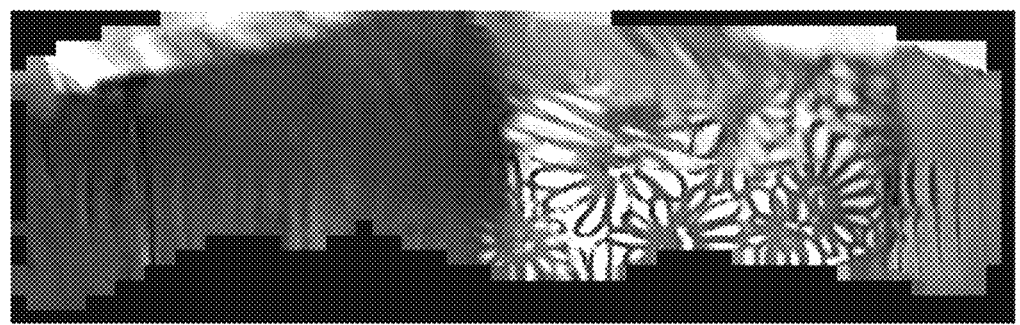

FIGS. 14A and 14B show a portion of an atlas image before and after block-filling, respectively, according to an embodiment of the present invention. Note that the dark pixels inside the area 1402 before block-filling, as shown in FIG. 14A, are textured after block filling, as shown in FIG. 14B. Also, after block filling, the edges of the component are noticeably more jagged. The exemplary textured atlas images shown in FIGS. 10 and 11 have been block-filled for the JPEG compression standard according to an embodiment of the present invention.

For more advanced compression standards, such as the H.264/AVC and H.265/HEVC standards, a block may be first predicted from a neighboring block. In cases where a dark block has a textured neighboring block, the prediction from the neighboring block may be significantly different from the dark block, which may result in low compression efficiency for prediction-based compression standards. According to an embodiment, a block-level filling operation may be performed.

Figure 15:
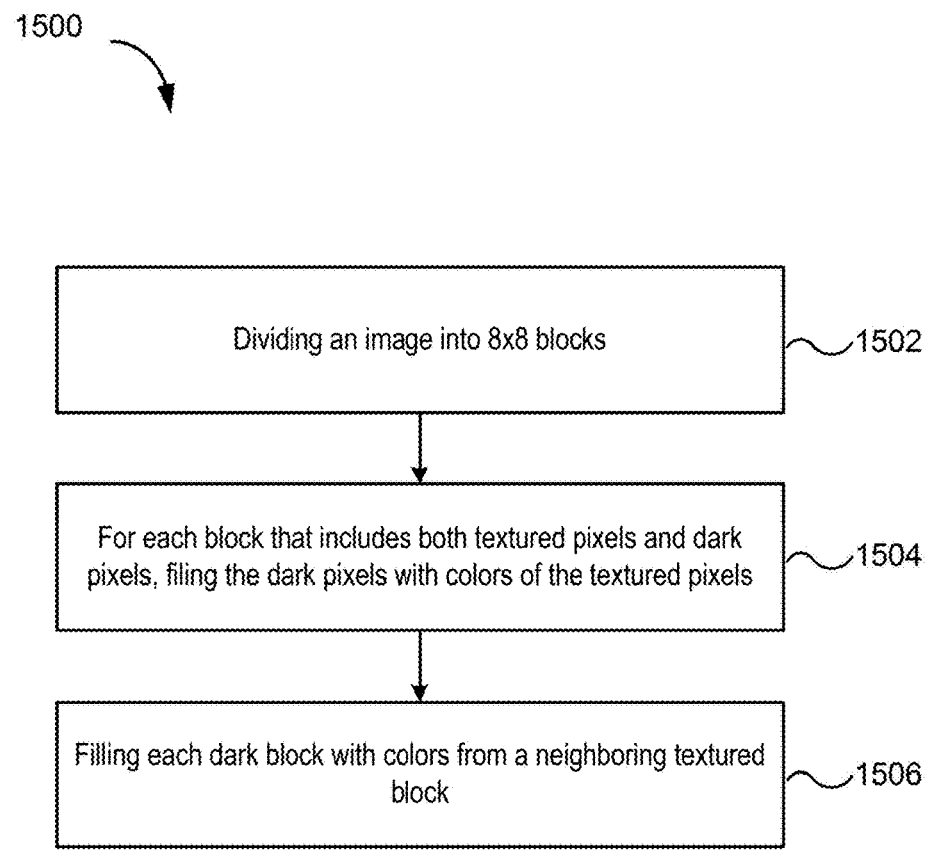
FIG. 15 shows a simplified flowchart illustrating a method of block-level filling of a textured atlas according to an embodiment of the present invention.

FIG. 15 shows a simplified flowchart illustrating a method 1500 of block-level filling according to an embodiment of the present invention. The method 1500 includes, at 1502, dividing an atlas image into 8×8 blocks; and at 1504, for each 8×8 block that includes both textured pixels and dark pixels, filling the dark pixels with colors from textured pixels, using for example a flood fill algorithm. The method 1500 further includes, at 1506, filling each dark block with colors from a neighboring textured block. In one embodiment, if a dark block copies colors from a left or a right neighboring block, each pixel copies the color from a neighboring pixel in the same row; if a dark block copies colors from an upper or lower neighboring block, each pixel copies the color from a neighboring pixel in the same column.

As described above, embodiments of the present invention provide methods of packing a 3D triangle mesh into textured atlases that may result in efficient memory usage. The methods may be particularly advantageous as applied to 3D meshes that represent objects with shape-orthogonality characteristics, such as houses and buildings that include walls, ceilings, or floors, which are either parallel or perpendicular to each other.

Figure 16A:
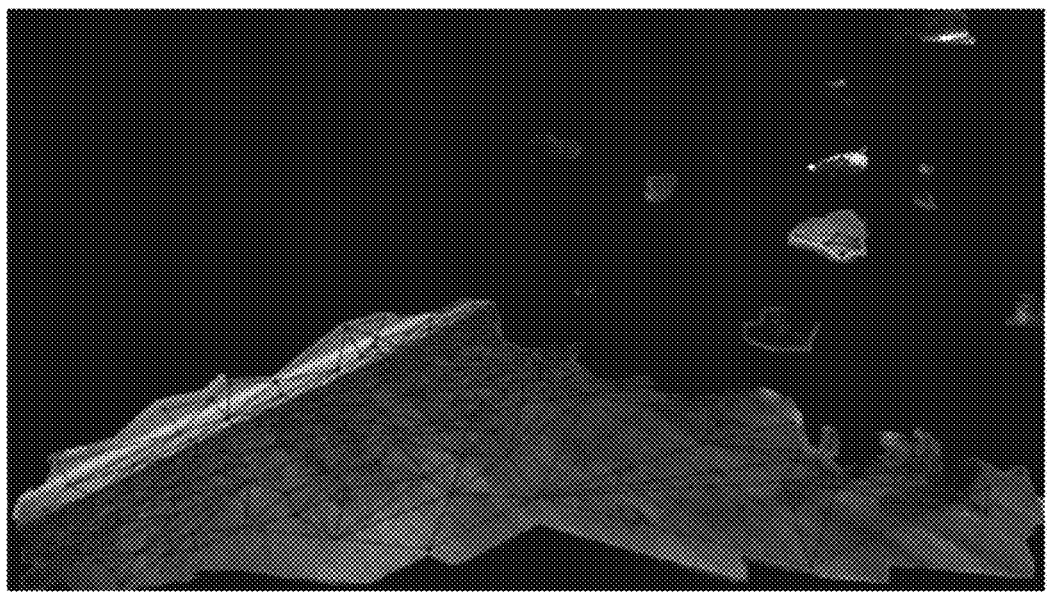
FIGS. 16A and 16B show some exemplary atlas images created by masking textured components from color images directly.
Figure 16B:
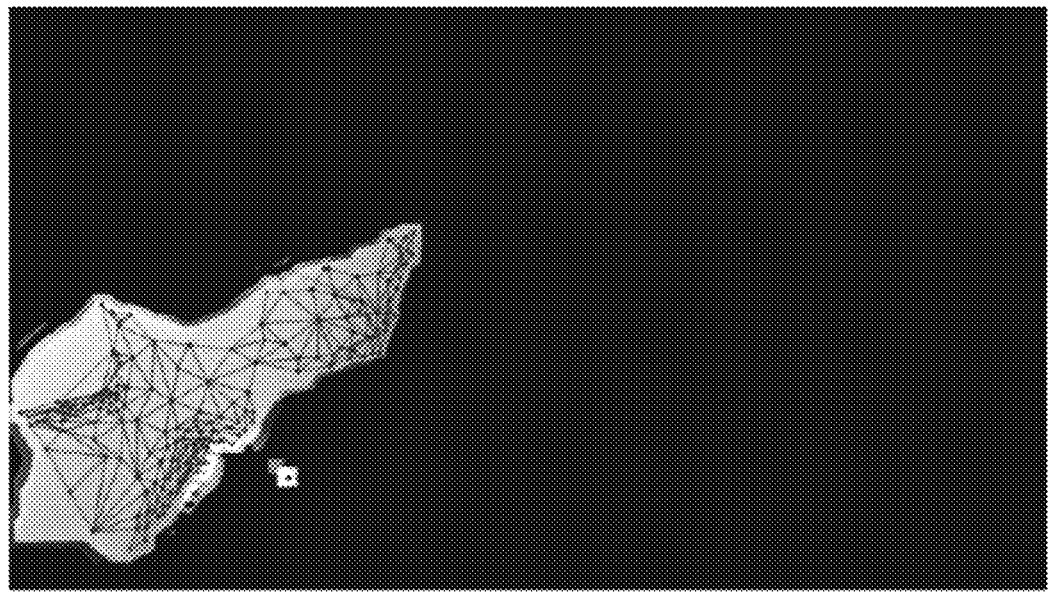

For comparison, FIGS. 16A and 16B show some exemplary atlas images created by masking textured components from color images directly using a conventional method. As can be seen in FIGS. 16A and 16B, each atlas image includes large dark areas. For each atlas, the textured area is only a small fraction of the total atlas area. Therefore, the atlases shown in FIGS. 16A and 16B may have low efficiency of memory and storage usage. In contrast, the atlases illustrated in FIGS. 10 and 11 are much more efficiently packed.

G. Method of Orthogonal-Projection-Based Texture Atlas Packing

Figure 17:
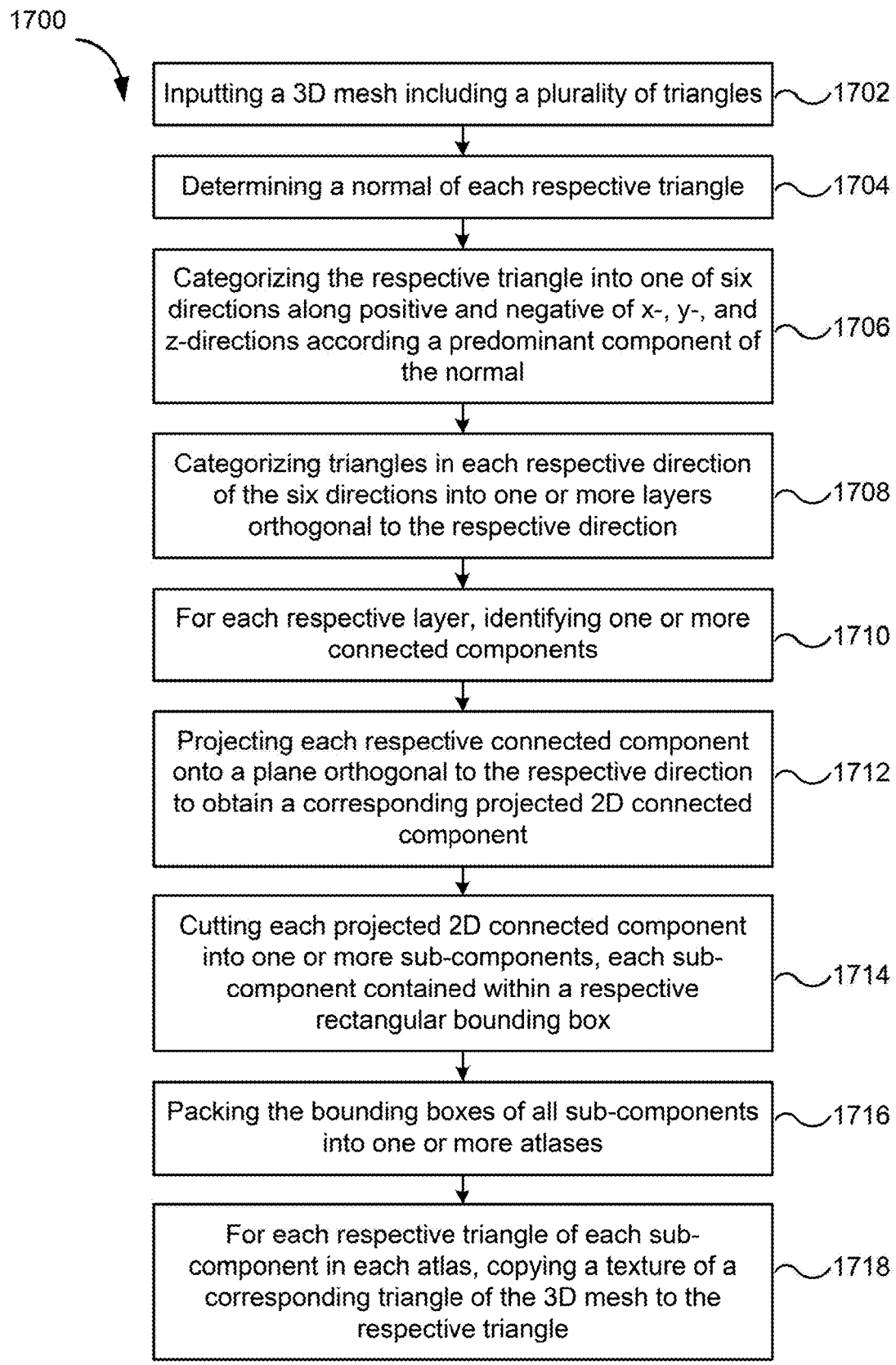
FIG. 17 shows a simplified flowchart illustrating a method of texture atlas packing according to an embodiment of the present invention.

FIG. 17 shows a simplified flowchart illustrating a method 1700 of texture atlas packing according to an embodiment of the present invention. The method 1700 includes, at 1702, inputting a three-dimensional (3D) mesh. The 3D mesh may include a plurality of triangles representing surfaces of one or more objects. Each triangle has a respective texture.

The method 1700 further includes, at 1704, for each respective triangle, determining a normal of the respective triangle; and at 1706, categorizing the respective triangle into one of six directions along positive and negative of x-, y-, and z-directions according a predominant component of the normal. The method 1700 further includes, at 1708, categorizing triangles in each respective direction of the six directions into one or more layers orthogonal to the respective direction.

The method 1700 further includes, at 1710, for each respective layer in a respective direction, identifying one or more connected components. Each connected component includes a plurality of connected triangles connected by common edges or corners. The method 1700 further includes, at 1712, projecting each respective connected component onto a plane orthogonal to the respective direction to obtain a corresponding projected two-dimensional (2D) connected component. The method 1700 may further include, at 1714, cutting the projected 2D connected component into one or more sub-components. Each sub-component may be contained within a respective rectangular bounding box.

The method 1700 further includes, at 1716, packing the bounding boxes of all sub-components of all projected 2D connected components in all layers in all directions into one or more atlases; and at 1718, for each respective triangle of each sub-component in each atlas, copying a texture of a corresponding triangle of the 3D mesh to the respective triangle.

A person skilled in the art can further understand that, various exemplary logic blocks, modules, circuits, and algorithm steps described with reference to the disclosure herein may be implemented as electronic hardware, computer software, or a combination of electronic hardware and computer software. For examples, the modules/units may be implemented by a processor executing software instructions stored in the computer-readable storage medium.

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment, or the part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on the functions involved. Each block in the block diagram and/or flowchart, and a combination of blocks in the block diagram and/or flowchart, may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer-readable storage media (including but not limited to a magnetic disk memory, a CD-ROM, an optical memory and so on) containing computer-readable program codes.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer-readable memory that can direct a computer or other programmable data processing devices to function in a particular manner, such that the instructions stored in the computer-readable memory produce a manufactured product including an instruction means that implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams. In a typical configuration, a computer device includes one or more Central Processing Units (CPUs), an input/output interface 1816, a network interface, and a memory. The memory may include forms of a volatile memory, a random access memory (RAM), and/or non-volatile memory and the like, such as a read-only memory (ROM) or a flash RAM in a computer-readable storage medium. The memory is an example of the computer-readable storage medium.

The computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The computer-readable storage medium includes non-volatile and volatile media, and removable and non-removable media, wherein information storage can be implemented with any method or technology. Information may be modules of computer-readable instructions, data structures and programs, or other data. Examples of a computer-storage medium include but are not limited to a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices, or any other non-transmission media that may be used to store information capable of being accessed by a computer device. The computer-readable storage medium is non-transitory, and does not include transitory media, such as modulated data signals and carrier waves.

The specification has described methods, apparatus, and systems for orthogonal-projection-based texture atlas packing of 3D meshes. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with the disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof.

What is claimed is:

1. A method of atlas packing for computer graphics performed by one or more computer processors, the method comprising:
   receiving a three-dimensional (3D) mesh including a plurality of triangles representing surfaces of one or more objects, each triangle having a respective texture;
   for each respective triangle of the plurality of triangles:
      determining a normal of the respective triangle; and
      categorizing the respective triangle into one of six directions along positive and negative of x-, y-, and z-directions according a predominant component of the normal;
   categorizing triangles in each respective direction of the six directions into one or more layers orthogonal to the respective direction;
   for each respective layer in a respective direction:
      identifying one or more connected components, each connected component comprises a plurality of connected triangles;
      projecting each respective connected component onto a plane orthogonal to the respective direction to obtain a corresponding projected two-dimensional (2D) connected component; and
      cutting the projected 2D connected component into one or more sub-components, each sub-component contained within a respective rectangular bounding box;
   packing the bounding boxes of all sub-components of all projected 2D connected components in all layers in all directions into one or more atlases;
   for each respective triangle of each sub-component in each atlas, copying a texture of a corresponding triangle of the 3D mesh to the respective triangle; and
   storing the one or more atlases in a computer memory.

2. The method of claim 1, further comprising, before categorizing the triangles:
   identifying one or more major surfaces of the 3D mesh; and
   rotating the 3D mesh to align normals of the one or more major surfaces with one or more of x-, y-, and z-directions.

3. The method of claim 1 wherein categorizing the triangles in each respective direction into the one or more layers comprises:
   dividing a space in the respective direction by a plurality of planes orthogonal to the respective direction; and
   categorizing triangles lying between two adjacent planes into one layer.

4. The method of claim 1 wherein cutting the projected 2D connected component into the one or more sub-components minimizes a sum of areas of the bounding boxes for the one or more sub-components.

5. The method of claim 4 wherein each sub-component has substantially a rectangular shape.

6. The method of claim 4 wherein cutting the projected 2D connected component comprises:
   identifying an edge of the projected 2D connected component in a horizontal direction or a vertical direction; and
   cutting the projected 2D connected component along a straight horizontal line or a straight vertical line at the identified edge to divide the projected 2D connected component into two or more sub-components.

7. The method of claim 6 wherein cutting the projected 2D connected component further comprises, before identifying the edge:
   rotating the projected 2D connected component to minimize an area of a rectangular bounding box containing the projected 2D connected component.

8. The method of claim 1 wherein packing the bounding boxes of all sub-components comprises:
   sorting the bounding boxes for all sub-components in a descending order by lengths of their longer edges;
   picking a first unpacked bounding box;
   searching for an available space in all current atlases that the first unpacked bounding box can fit into; and
   packing the first unpacked bounding box in the available space.

9. The method of claim 1 further comprising, before storing the one or more atlases:
   dividing each atlas into a plurality of blocks, each block including a plurality of pixels; and
   for each block that includes both textured pixels and dark pixels, filling dark pixels with colors from textured pixels;
   wherein storing the one or more atlases uses a compression standard.

10. The method of claim 1 further comprising, before storing the one or more atlases:
    dividing each atlas into a plurality of blocks, each block including a plurality of pixels;
    for each block that includes both textured pixels and dark pixels, filling dark pixels with colors from textured pixels; and
    filling each block that includes only dark pixels with colors from a neighboring textured block;
    wherein storing the one or more atlases uses a compression standard.

11. A non-transitory computer-readable storage medium comprising a plurality of computer-readable instructions tangibly embodied on the computer-readable storage medium, which, when executed by a computer processor, perform atlas packing for computer graphics, the plurality of instructions comprising:
- instructions that cause the computer processor to receive a three-dimensional (3D) mesh including a plurality of triangles representing surfaces of one or more objects, each triangle having a respective texture;
- instructions that cause the computer processor to, for each respective triangle of the plurality of triangles:
  - determine a normal of the respective triangle; and
  - categorize the respective triangle into one of six directions along positive and negative of x-, y-, and z-directions according a predominant component of the normal;
- instructions that cause the computer processor to categorize triangles in each respective direction of the six directions into one or more layers orthogonal to the respective direction;
- instructions that cause the computer processor to, for each respective layer in a respective direction:
  - identify one or more connected components, each connected component comprises a plurality of connected triangles;
  - project each respective connected component onto a plane orthogonal to the respective direction to obtain a corresponding projected two-dimensional (2D) connected component; and
  - cut the projected 2D connected component into one or more sub-components, each sub-component contained within a respective rectangular bounding box;
- instructions that cause the computer processor to pack the bounding boxes of all sub-components of all projected 2D connected components in all layers in all directions into one or more atlases;
- instructions that cause the computer processor to, for each respective triangle of each sub-component in each atlas, copy a texture of a corresponding triangle of the 3D mesh to the respective triangle; and
- instructions that cause the computer processor to store the one or more atlases in a computer memory.

12. The non-transitory computer-readable storage medium of claim 11 wherein the plurality of instructions further comprising instructions that cause the computer processor to, before categorizing the triangles:
- identify one or more major surfaces of the 3D mesh; and
- rotate the 3D mesh to align normals of the one or more major surfaces with one or more of x-, y-, and z-directions.

13. The non-transitory computer-readable storage medium of claim 11 wherein the instructions that cause the computer processor to categorize triangles in each respective direction into the one or more layers includes:
- instructions that cause the computer processor to divide a space in the respective direction by a plurality of planes orthogonal to the respective direction; and
- instructions that cause the computer processor to categorize triangles lying between two adjacent planes into one layer.

14. The non-transitory computer-readable storage medium of claim 11 wherein cutting the projected 2D connected component into the one or more sub-components minimizes a sum of areas of the bounding boxes for the one or more sub-components.

15. The non-transitory computer-readable storage medium of claim 14 wherein each sub-component has substantially a rectangular shape.

16. The non-transitory computer-readable storage medium of claim 14 wherein the instructions that cause the computer processor to cut the projected 2D connected component comprises:
- instructions that cause the computer processor to identify an edge of the projected 2D connected component in a horizontal direction or a vertical direction; and
- instructions that cause the computer processor to cut the projected 2D connected component along a straight horizontal line or a straight vertical line at the identified edge to divide the projected 2D connected component into two or more sub-components.

17. The non-transitory computer-readable storage medium of claim 16 wherein the instructions that cause the computer processor to cut the projected 2D connected component further comprises:
- instructions that cause the computer processor to, before identifying the edge, rotate the projected 2D connected component to minimize an area of a rectangular bounding box containing the projected 2D connected component.

18. The non-transitory computer-readable storage medium of claim 16 wherein the instructions that cause the computer processor to pack the bounding boxes of all sub-components comprises:
- instructions that cause the computer processor to sort the bounding boxes for all sub-components in a descending order by lengths of their longer edges;
- instructions that cause the computer processor to pick a first unpacked bounding box;
- instructions that cause the computer processor to search for an available space in all current atlases that the first unpacked bounding box can fit into; and
- instructions that cause the computer processor to pack the first unpacked bounding box in the available space.

19. The non-transitory computer-readable storage medium of claim 11 wherein the plurality of instructions further comprising:
- instructions that cause the computer processor to, before storing the one or more atlases:
  - divide each atlas into a plurality of blocks, each block including a plurality of pixels; and
  - for each block that includes both textured pixels and dark pixels, fill dark pixels with colors from textured pixels;
- wherein storing the one or more atlases uses a compression standard.

20. The non-transitory computer-readable storage medium of claim 11 wherein the plurality of instructions further comprising:
- instructions that cause the computer processor to, before storing the one or more atlases:
  - divide each atlas into a plurality of blocks, each block including a plurality of pixels;
  - for each block that includes both textured pixels and dark pixels, fill dark pixels with colors from textured pixels; and
  - fill each block that includes only dark pixels with colors from a neighboring textured block;
- wherein storing the one or more atlases uses a compression standard.

\* \* \* \* \*